United States Patent
Hall et al.

(10) Patent No.: US 10,810,882 B2
(45) Date of Patent: Oct. 20, 2020

(54) PARKING ASSIST APPARATUS

(71) Applicants: David R. Hall, Provo, UT (US); Corey Webb, Spanish Fork, UT (US); Casey Webb, Spanish Fork, UT (US); Clint Cook, American Fork, UT (US); Christopher Jones, Spanish Fork, UT (US)

(72) Inventors: David R. Hall, Provo, UT (US); Corey Webb, Spanish Fork, UT (US); Casey Webb, Spanish Fork, UT (US); Clint Cook, American Fork, UT (US); Christopher Jones, Spanish Fork, UT (US)

(73) Assignee: Hall Labs LLC, Provo, UT (US)

(*) Notice: Subject to any disclaimer, the term of this patent is extended or adjusted under 35 U.S.C. 154(b) by 0 days.

(21) Appl. No.: 15/956,251

(22) Filed: Apr. 18, 2018

(65) Prior Publication Data

US 2019/0005824 A1   Jan. 3, 2019

Related U.S. Application Data

(60) Provisional application No. 62/526,652, filed on Jun. 29, 2017.

(51) Int. Cl.
*G08G 1/16* (2006.01)
*G08G 1/14* (2006.01)
*G08G 1/04* (2006.01)

(52) U.S. Cl.
CPC ............... *G08G 1/168* (2013.01); *G08G 1/04* (2013.01); *G08G 1/143* (2013.01); *G08G 1/144* (2013.01); *G08G 1/146* (2013.01)

(58) Field of Classification Search
CPC .......... G07B 15/02; G07B 15/00; G08G 1/14; G08G 1/146; G01C 21/20; G01C 21/343; G05D 1/0088; G06F 17/00
See application file for complete search history.

(56) References Cited

U.S. PATENT DOCUMENTS

| | | | |
|---|---|---|---|
| 2003/0169183 A1* | 9/2003 | Korepanov | G07F 17/246 340/932.2 |
| 2005/0192036 A1* | 9/2005 | Greenwood | H04N 5/232 455/501 |
| 2008/0177443 A1* | 7/2008 | Lee | B62D 15/0285 701/41 |
| 2009/0121899 A1* | 5/2009 | Kakinami | B62D 15/027 340/932.2 |
| 2009/0174574 A1* | 7/2009 | Endo | B60R 1/00 340/932.2 |
| 2009/0309759 A1* | 12/2009 | Williams | G08G 1/14 340/932.2 |

(Continued)

FOREIGN PATENT DOCUMENTS

WO   WO-2017041941 A1 *   3/2017   ............ B60W 30/09

*Primary Examiner* — Nabil H Syed
*Assistant Examiner* — Cal J Eustaquio

(57) ABSTRACT

There is disclosed a system to assist in parking a vehicle. The system includes an overhead sensor, a controller adapted to receive instructions from a remote device to set an optimum parking position, and wherein the controller is adapted to display one or more guidelines on a display screen in the vehicle to indicate the position of the vehicle in relation to the optimum parking position.

17 Claims, 1 Drawing Sheet

(56) References Cited

U.S. PATENT DOCUMENTS

| | | | | |
|---|---|---|---|---|
| 2012/0086798 | A1* | 4/2012 | Iwazaki | B62D 15/0295 |
| | | | | 348/118 |
| 2013/0063601 | A1* | 3/2013 | Wakabayashi | B60R 1/00 |
| | | | | 348/148 |
| 2014/0077973 | A1* | 3/2014 | Lai | G08G 1/146 |
| | | | | 340/932.2 |
| 2015/0154802 | A1* | 6/2015 | Song | G08B 5/00 |
| | | | | 345/633 |
| 2016/0203721 | A1* | 7/2016 | Wright | H04N 7/18 |
| | | | | 348/118 |
| 2016/0272024 | A1* | 9/2016 | Bochenek | B60D 1/36 |
| 2016/0379495 | A1* | 12/2016 | Engelen | G08G 1/005 |
| | | | | 340/932.2 |
| 2018/0240343 | A1* | 8/2018 | Nordbruch | B60W 30/09 |
| 2018/0319327 | A1* | 11/2018 | Cunningham, III | G08G 1/167 |

* cited by examiner

PARKING ASSIST APPARATUS

CROSS-REFERENCE TO RELATED APPLICATIONS

This application is a continuation of U.S. provisional application No. 62/526,652 filed 29 Jun. 2017. The entire disclosure of which is incorporated herein by reference.

TECHNICAL FIELD

This invention relates generally to parking assist apparatuses.

BACKGROUND

When parking a vehicle in a garage or other confined space, it may be difficult to park without hitting or running into the surroundings, such as a wall or object which is in the confined space or garage. This is due to limited vision and the difficulty of maneuvering a vehicle. Parking assist apparatuses exist which act as a guide and aid to an individual parking a vehicle. Some of these apparatuses include a stop sign, a string with a ball attached, or a laser light which is mounted to a ceiling.

The stop signs are placed on the ground and may take up limited and valuable garage floor space. When individuals use a string with a ball on the end, they have to readjust the height of the ball various times by shortening or lengthening the string so that it hits the appropriate spot on their vehicle when they are parked in the optimal position. This may be accomplished by guessing and checking, which is often ineffective. The lasers require the user to manually adjust a laser beam's position by shifting the laser itself, which laser indicates where a driver should stop their vehicle. This is inconvenient because a user must either guess where the laser should be positioned as a guide for their vehicle, and then move their vehicle and determine if the laser is in the appropriate position, or park their vehicle, and then attempt to climb above their vehicle and position the laser. The latter option may be dangerous, inefficient, and difficult. In addition, if more than one vehicle is parked in the same garage or confined space, the vehicles may be different sizes and may require the laser to point to a different place depending on which vehicle is being parked. Because existing laser park assist apparatuses are often motion activated, they have no way of identifying which or what type of vehicle is being parked. Some laser park assist apparatuses include two lasers for a two-car garage, but this requires that a user consistently park each vehicle in the same spot, and that they adjust both laser lights manually to appropriately guide the corresponding vehicles.

Also, none of these apparatuses are capable of indicating to a driver that there is an object in the way. For example, sometimes it is difficult to see an object which is close to the front of the hood of the car if the object is on the ground or not very tall. This can be especially true in a garage, which is often dark or dimly lit. In these cases, a driver may inadvertently run over a toy or bike as they are attempting to park.

SUMMARY

In a first aspect, the disclosure provides a system to assist in parking a vehicle comprising an overhead sensor, for example a camera, a controller adapted to receive instructions from a remote device to set an optimum parking position, and wherein the controller is adapted to display one or more guidelines on a display screen (for example a backup screen which may, for example, be located on a vehicle's dash board or on the rear view mirror) and which indicates the position of the vehicle in relation to the optimum parking position.

In a second aspect, the disclosure provides a parking assist apparatus comprising a short-range wireless beacon, for example a beacon equipped with Bluetooth, wherein the short-range wireless beacon is adapted to send signals to the overhead sensor and wherein the beacon is connected to a vehicle, or wherein the beacon is an app on a smart phone.

In a third aspect, the parking assist apparatus includes a concentrated light, such as a laser, for guiding and directing a vehicle to the optimal parking position. It also includes a remote device for sending signals to the controller. In one example, the remote device is a smart phone running an app. Additionally, the laser park assist apparatus may be comprised of speakers for giving audible commands and directions, and infrared lights for enabling a camera to capture images or video when it is dark or when lighting is insufficient.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative, and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figure 2A:
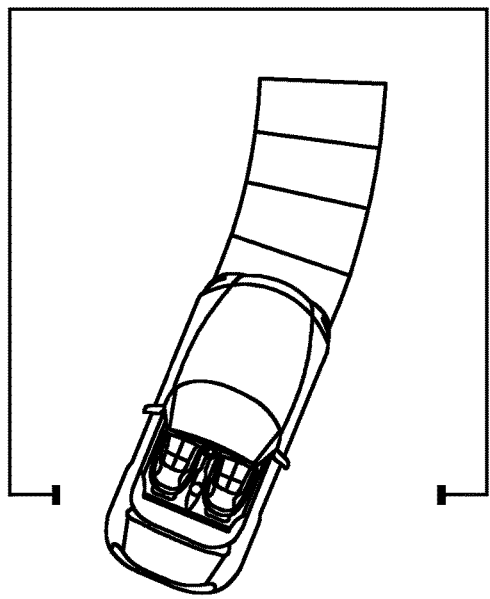
FIG. 2A is a top view of guidelines on a screen for guiding a vehicle to the optimal parking position.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure, and are not meant to be limiting in any fashion. Nor do these phrases indicate any kind of preference for the disclosed embodiment.

Preferably, the parking assist apparatus is equipped with short-range wireless connection, such as Bluetooth, thus allowing it to be controlled wirelessly by a device such as a smart phone. As such, after installing the parking assist apparatus, users can make adjustments to the position of the overhead sensor or a concentrated light from the ground level with their smart phone or other short-range wireless connection device. As such, they are able to alter the position of the concentrated light, which may be a laser, without needing to move the light manually. Users do not need to climb back up to the concentrated light, and they can park their vehicle and make necessary adjustments without having to try and get to the concentrated light above their vehicle while it is parked. Additionally, the parking assist apparatus is able to transmit a live feed of the bird's-eye-view. The live feed can be received on a driver's smart phone, or wherein a vehicle is equipped, on a screen in a vehicle (such as back-up screen). This allows a driver to see exactly where their vehicle is in the garage or confined space, and how close they are to any walls or other objects that may otherwise be unseen, such as a toy that is in front of the vehicle. Also, it is often the case that different vehicles need to be parked in the same garage space at different times. For example, an individual might own a truck and a sedan, and want to alternate parking them in the same spot in a garage. The parking assist apparatus is able to read which vehicle is being parked because the short-range wireless beacon is in communication with the overhead sensor and sends a signal to the overhead sensor, indicating which vehicle is approaching. The overhead sensor accordingly adjusts its position to suit the vehicle being parked.

The parking assist apparatus is comprised of a short-range wireless beacon which may be coupled to a vehicle. The short-range wireless beacon can be integrated into a cigarette lighter charging port and/or contain batteries, and emits a signal to the overhead sensor such that the overhead sensor receives information indicating which vehicle is approaching. This is accomplished because the overhead sensor and the short-range wireless beacon connect to the same network, allowing them to share data. The shared network could be a private network, localized network, (wherein devices at a single location are able to share information, such as a home network) or a public network. Each beacon has a unique advertisement—that is, a radio frequency—coded thereon which is a unique identifier. The short-range wireless beacon constantly emits the advertisement, and when it approaches the overhead sensor, the overhead sensor is able to read the advertisement. Once the overhead sensor receives the advertisement, it is adapted to make adjustments to the guidelines which are viewable on a display screen—which may be a tablet, smart phone screen, or screen in a vehicle such as a backup screen or controls screen. Preferably, the parking assist apparatus provides a node for a WiFi network.

A concentrated light serves as an additional guide to a user as they are parking a vehicle. The concentrated light may be a laser, or in one example a red laser. In the current art, owners of laser parking assist apparatuses must know the exact spot on their dashboard where the guiding laser must be when they have reached the optimal parking position. This can be difficult to monitor or remember when parking a vehicle, as there are often distractions when parking a vehicle—such as when other people are in the car, when the driver is talking on the phone, or when music is playing. The parking assist apparatus eliminates the need for a user to memorize where the concentrated light must be on their vehicle in order to indicate that they should stop. This is accomplished by changing the color of the laser as soon as the vehicle has arrived at the position where it should stop. For example, the laser is red as a user is pulling in, and immediately turns to green once the user should stop and park the vehicle. In another embodiment, the laser is in the shape of a circle as the user is pulling in, and switches to the shape of an octagon when a user should stop and park the vehicle. Furthermore, the concentrated light may change color and shape simultaneously to indicate that a user should stop their vehicle. For example, the concentrated light shifts from a green circle to a red octagon when a user should stop their vehicle.

Preferably, the overhead sensor is a camera, and as such may provide a live bird's-eye-view image of a vehicle as it is parking. As a user is parking a vehicle, they can view their surroundings and where their vehicle is in the surroundings. Additionally, they are able to view any objects, animals, or people that might not be visible from a driver's perspective—such as a bike, shoes, skateboards, helmets, tools, a cat, a dog, or a child. In one embodiment, the parking assist apparatus is comprised of speakers. An alarm indicates to a user that they are approaching an object by making a beeping noise or by playing a warning such as "the vehicle is about to hit an object". Then, even if a user is not monitoring a display screen with a bird's-eye-view feed as they are parking, they receive an audible warning of an impending collision. Wherein the parking assist apparatus is not equipped with speakers, the alarm may also sound through a vehicle's speakers, or through the app on a smart phone.

In one embodiment, the overhead sensor is an active-pixel sensor, such as a complementary metal-oxide-semiconductor (CMOS) sensor. A CMOS sensor is useful because it allows for capturing high quality video and images and requires less power and is smaller than a charged-coupled device (CCD) image sensor. A CMOS sensor processes the electrical charges received from light with an amplifier for each pixel, whereas a CCD sensor typically has only a single amplifier for all its pixels. This allows for a CMOS sensor to capture and process images very quickly, providing more information for a user as they use the parking assist apparatus for parking or for security surveillance. CMOS sensors can also zoom, which may be useful if a user uses the parking assist apparatus to monitor conditions in their garage when they are not there. The CMOS sensor may be a megapixel CMOS sensor, which further increases the amount of detail that the sensor can capture. This may be especially useful when trying to identify a person that the sensor has recorded or is recording. For example, if the overhead sensor is used to surveil, and a burglary has occurred, the possibility of identifying the thief is improved if the CMOS sensor is a megapixel CMOS sensor.

In another embodiment, the overhead sensor is a CCD image sensor, which, like a CMOS image sensor, is a light detection sensor that converts electrical data into a digital value. Both CMOS and CCD sensors have the ability to capture images in the near infrared, but CCD sensors capture more detail in the near infrared, making CCD image sensors a better sensor during the nighttime or in low light. CCD sensors are also less susceptible to noise, and may capture crisper and clearer images. Wherein the parking assist apparatus is placed in an area with very low light, such as a small garage without windows or lighting, a CCD image sensor may be preferred to a CMOS image sensor. Because CCD sensors require more power, they are more prone to overheating than a CMOS sensor. Wherein the overhead sensor is a CCD sensor, it may be a megapixel CCD sensor.

In yet another embodiment, the sensor may work by other means, such as thermal, sonar or radar imaging. The important trait for the sensor is that it can detect the perimeter of the vehicle in real time.

The overhead sensor may also be a camera configured for detecting motion, whereby the camera does not begin recording or sending any images until motion is detected.

The parking assist apparatus is equipped to draw guidelines for a vehicle based on which vehicle is parking, and to display these guidelines on a display screen. The guidelines may be composed of four angles, one for each corner of the vehicle, or of a single line that spans the width of the car, or of two lines near the front tires of the car. It may also be a closed box or an open box. As a user pulls their car into a garage or other confined space, the overhead sensor receives the advertisement from the short-range wireless beacon, and the parking assist apparatus indicates where the lines should be displayed on a display screen. Then a user can see, via their display screen, their vehicle from an overhead view, and lines wherein the vehicle should be fitted for a preferred parking position. Correctional guidelines may also be displayed on a display screen. For example, it is sometimes difficult to park a vehicle at the best angle. This may be true when driving a large vehicle, when driving at night, or when driving a new vehicle that a user is not yet familiar with. When pulling into a garage at a wrong angle, a user is at risk of hitting a wall or other object. The parking assist apparatus, however, also displays correctional guidelines, displayed on a display screen, indicating to a user to what degree and in which direction they should turn their vehicle wheels in order to straighten out or to pull into the preferred parking spot for the vehicle that they are driving. For example, if a user is driving a new truck and they enter the garage at a slight angle when they should enter straight, the parking assist apparatus displays, on a display screen, guidelines which may veer left, indicating that a user should turn their wheels to the left in order to properly align their vehicle with the preferred parking position The overhead sensor may be a motion sensor or a camera. In some embodiments, the display screen built into a vehicle may not be adapted to connect to the parking assist apparatus. A module may be adapted to connect to a speaker, such that the live feed captured by the overhead sensor is displayed onto a display screen in a vehicle. In one embodiment, the short-range wireless beacon and the module are combined into one module.

Wherein the parking assist apparatus is equipped to use LIDAR, the parking assist apparatus measures distances with the concentrated light which is preferably a laser, and may use LIDAR to determine how far from or close to the optimum parking position a user is as they are parking a vehicle. As a user is parking a vehicle, LIDAR is enabled and gives the user updates indicating how close they are to their optimum parking position. For example, as a user is pulling their vehicle into their garage, LIDAR may indicate that a user is 50% of the way to their optimum parking position, and as a user continues to move the vehicle forward, an update is issued indicating that the user is now 90% of the way to the optimum parking position. These updates may be played over the speakers on the parking assist apparatus, or may be played on the speakers of a user's phone, or shown on an app running on a user's smart phone.

The overhead sensor, which may be a camera, in a preferred embodiment, serves as a security camera with preset smart points. The smart points are selected by a user, and are comprised of recorded images of certain areas of the space wherein the parking assist apparatus is used. For example, a user may place the parking assist apparatus in a garage, and select that a man door, a house door, and the garage door are smart points. Then, the user indicates to the overhead sensor to record images of the selected smart points in a normal or nonemergency state. The user may indicate to the overhead sensor to capture the images of the smart points in a nonemergency state via an app or via controls on the parking assist apparatus. Once the nonemergency-state images are captured, a user may indicate to the parking assist apparatus with the app a security mode, away mode, or a night mode. A user is alerted if the camera detects motion in security mode, away mode, or night mode. This is accomplished with sensors. If a motion sensor is triggered by the man door when the parking assist apparatus is in security mode, the camera will rotate towards the smart point that indicated motion, and send a live feed to a user's smart phone, tablet, or computer. It may also send the live feed to an app. The app may alert a user that a change has occurred, and that there is potential risk or danger imminent.

Preferably, the camera also detects and follows motion. For example, if a burglar breaks into the space wherein a user has placed the parking assist apparatus, the camera will follow the burglar as they move around, and send the images and live feed to the user. The camera is equipped with infrared lights, such that it is able to record at night and send videos or images to a user's smartphone during nighttime, for example.

In addition, the parking assist apparatus is adapted to communicate with products such as those described in U.S. application Ser. No. 15/587,937 filed on 5 May 2017. This is useful in the event that a user is not nearby the area that the parking assist apparatus is monitoring. For example, U.S. application Ser. No. 15/587,937 describes a bike lift. If an individual wants to lower the bike lift, the user of the parking assist apparatus can point the camera to view the bike lift, and determine if it safe to lower it.

Additionally, the concentrated light or laser may be set to a random mode with the app, wherein the laser darts around a space in no specific pattern to entertain an animal such as a cat.

The short-range wireless beacon may be equipped with a button which when pressed will send an advertisement to the overhead sensor. This may be useful in the event that the overhead sensor is not properly reading the advertisement, or if a short-range wireless beacon malfunctions and does not automatically send the overhead sensor an advertisement.

Preferably the overhead sensor is a camera. The camera may include a housing, power, communication and control electronics, a motor, a rotatable camera mount extending from the housing, daisy-chain electrical outlets, an optical lens, and a lens housing rotatably mounted to the camera mount. The power, control and/or communication electronics may be similar to that described in the U.S. Pat. No. 9,624,076B2 filed 3 Apr. 2014. The camera may interconnnect with other dissimilar or similar smart devices as described in the U.S. patent application Ser. No. 15/441,928 filed on 24 Feb. 2017. The dual rotatable housings may allow for near- or complete-360 degree rotation of the camera lens. Preferably, the camera is rotatable 180 degrees about a vertical plane. The motor that rotates the rotatable camera mount may be disposed within the housing, a rotor or other transmissive element of the motor extending from the housing into the rotatable mount. A transmission element, such as a gear surface, may be fixed to the rotatable mount and engage with the rotatable element extending from the housing. A separate motor may be disposed within the lens housing. The upper housing of the camera may include key slots that may mount the camera to a smart track mounting system as described in U.S. patent application Ser. No. 15/48,860 filed on 17 Apr. 2017, U.S. patent application Ser. No. 15/605,518 filed on 25 May 2017, and/or U.S. patent application Ser. No. 15/608,459 30 May 2017.

The camera may seamlessly integrate with other smart devices via a single computer and/or smartphone application. The camera may communicate wirelessly directly with each device, wirelessly via the computer/smartphone, or via a cloud-based network and/or server. Additionally, the camera may communicate over a network such as is described in the U.S. Pat. No. 9,268,126 filed 3 May 2016. Instructions for operating the camera may be stored on the camera's controller, the computer/smartphone, and/or the cloud-based server. Operation of the camera may be correlated to operation of another smart device via the application. The application may include an option to activate the camera and point the camera at a preset smart point when another device activates or otherwise comes into operation. For example, the camera may activate and point the lens towards a volume beneath a smart light when the smart light is motion-activated. Such may be programmed by selecting the smart point and activation of the camera in the smart light portion of the application. The camera may further include instructions to sweep between two or more volumes when two or more smart lights are motion-activated.

The camera may include pre-programmed smart points and/or pre-programmed times of operation. For example, when the app is set to "away from home," the camera may point at specified volumes of a room and record one or a few snapshots of the volume, then move to another preset smart point to capture another portion of the room. In this way, a single camera may be used to efficiently monitor a room for security. The cloud-based server may be programmed with image-recognition software. The server may store images pre-selected by a user to represent a permitted and/or secure state of the room. As the camera performs its security sweep by taking images at smart points, the cloud-based server may store images that deviate from the pre-selected images and indicate a form of emergency, such as a fire, flooding, and/or intruders. Images that do not meet these thresholds may be discarded from the server, whereas images that do meet these thresholds may be stored. The user may program alerts for emergencies based on deviations from the pre-selected images, and/or may choose to have emergency authorities automatically notified via the server of an emergency.

The camera may additionally include pre-programmed smart points that correspond to safe operation of a device. For example, the camera may include programming that instructs it to point towards a garage door and record/stream as the garage door opens and/or closes, upon receiving a notification from the garage door that the door is actuating. As another example, the camera may include programming that instructs it to point towards an area beneath a motorized lifting device, such as that described in various of the incorporated references, upon receiving a notification from the server and/or the lifting device that the device is lowering an object. Such operation may specifically correspond to a selection by the user in the application that the operator of the lifting device is not present in the room with the lifting device as it is operating.

Figure 1:
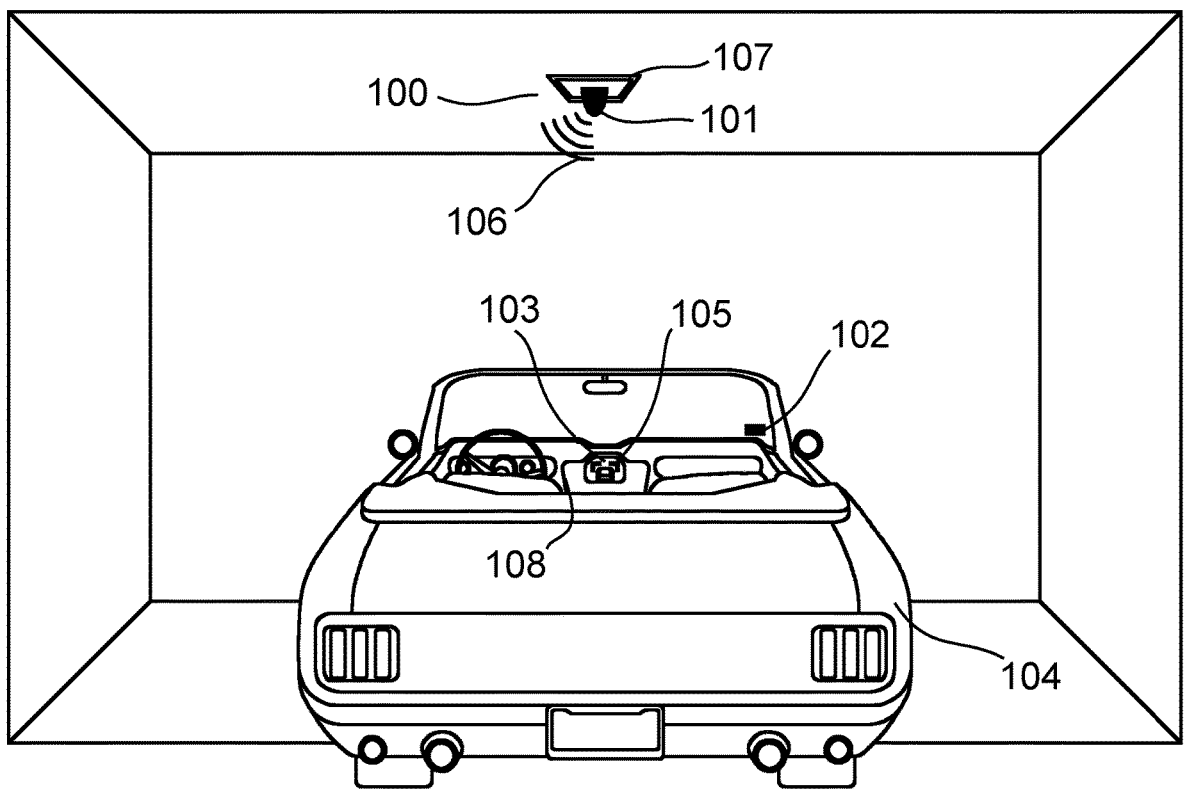
FIG. 1 is a front view of a vehicle parking in a garage while using the parking assist apparatus.

Now referring to FIG. 1, the parking assist apparatus 100 is mounted to an overhead or ceiling by mounting hardware 107. A vehicle, 104, is pulling into the garage and as it approaches the garage the short-range wireless beacon 102 emits a signal or advertisement to the overhead sensor 101. The overhead sensor 101 receives the signal and adjusts the guidelines 105 that are displayed on the display screen 103 of the vehicle 104. The live feed 108 of the overhead sensor 101 is useful because a driver sees their vehicle position while they are parking. They can also see any objects or items that might be in the way and that are not visible from their perspective. If an object were in the way of the vehicle 104, the speakers 106 can sound an alarm or play a message to warn the driver.

Figure 2B:
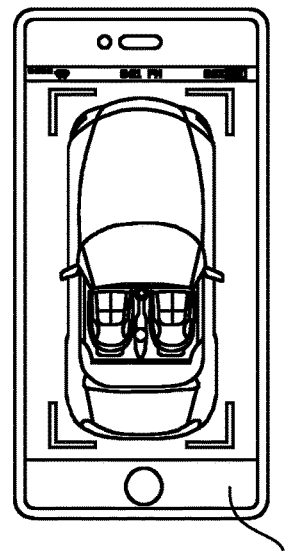
FIG. 2B is a top view of a smart phone running an app and showing the live feed from the overhead sensor.

FIG. 2A depicts an example display for a display screen showing correctional guidelines 200. The correctional guidelines 200 show how a driver should move their vehicle 104 in order to arrive at the optimal parking position. FIG. 2B is an overhead view of a display with guidelines 105 at each corner of the vehicle, demonstrating a vehicle 104 that has been parked within the guidelines 105. In one embodiment, the guidelines displayed on a display screen are a certain color, such as yellow. Once a vehicle has fit into the guidelines, and thus arrived at the optimal parking position, the guidelines change from one color such as yellow, to another, such as green. In FIG. 2B, the display screen 103 is a on a smart phone 201.

All patents and patent applications referred to herein are incorporated herein by reference. The invention has been described with reference to various specific and preferred embodiments and techniques. Nevertheless, it is understood that many variations and modifications may be made while remaining within the spirit and scope of the invention.

What is claimed is:

1. A system to assist in parking a vehicle comprising:
    an overhead sensor mounted to a ceiling of a garage; a
        screen in the vehicle;
        a light;
        a controller in communication with the overhead sensor
            and the screen, wherein the controller includes
            instructions that are executable by the controller to:
            receive real-time signals from the overhead sensor;
            determine an optimum parking position for the
            vehicle in the garage; display an image of the vehicle
            on the screen;
        display parking lines identifying the optimum parking
            position within the garage on the screen with the
            image of the vehicle;
        display correctional guidelines to achieve the optimum
            parking position on the screen with the parking lines
            and the image of the vehicle; and
        control the light to project a concentrated visible light
            into the garage to visibly indicate a position of the
            vehicle in relation to the optimum parking position,
            wherein the concentrated light changes colors,
            shape, or both to indicate that the vehicle should
            stop.

2. The invention of claim 1, further comprising a short-range wireless beacon in the vehicle, wherein the instructions are further executable by the controller to receive an advertisement from the short-range wireless beacon.

3. The invention of claim 2, wherein the short-range wireless beacon is coupled to the vehicle.

4. The invention of claim 1, wherein the overhead sensor is a camera.

5. The invention of claim 2, wherein the instructions are further executable by the controller to adjust the parking lines based on inputs from the short-range wireless beacons.

6. The invention of claim 1, wherein the light uses LIDAR to measure distances to determine how close the vehicle is to achieving the optimum parking position.

7. The invention of claim 1, wherein the light is a laser.

8. The invention of claim 1, further comprising speakers.

9. The invention of claim 1, comprising preset smart points and modes, wherein the overhead sensor sends a live feed to a user when motion is detected during night mode, security mode, or away mode.

10. The invention of claim 8, further comprising alerting the user with the remote device when a state of emergency or potential danger is detected.

11. The invention of claim 8, wherein the instructions are further executable by the controller to sound an alarm when detecting a state of emergency or potential danger.

12. The invention of claim 1, wherein an audible alarm sounds when the vehicle approaches an object.

13. The invention of claim 1, further comprising infrared lights.

14. A method for parking a vehicle, comprising:
receiving an advertisement from a short-range wireless beacon within the vehicle;
receiving real-time signals from an overhead sensor; determining an optimum parking position for the vehicle; displaying an image of the vehicle on a screen;
displaying parking lines identifying the optimum parking position within a garage on the screen; and
displaying correctional guidelines to achieve the optimum parking position on the screen.

15. The method of claim 14, further comprising:
adjusting the parking lines based on the advertisement from the short-range wireless beacon.

16. The method of claim 14, further comprising:
controlling a light to project a concentrated visible light to visibly indicate a position of the vehicle in relation to the optimum parking position.

17. The method of claim 14, further comprising:
sounding an alarm when the vehicle approaches an object.

* * * * *